United States Patent [19]

Aoki

[11] Patent Number: 5,574,713
[45] Date of Patent: Nov. 12, 1996

[54] METHOD FOR CONTROLLING AN OPTICAL RECORDING DEVICE FOR IMPROVED RECORDING MARK DETECTION

[75] Inventor: Ikuo Aoki, Yokohama, Japan

[73] Assignee: Ricoh Company, Ltd., Tokyo, Japan

[21] Appl. No.: 232,678

[22] Filed: Apr. 25, 1994

[30] Foreign Application Priority Data

Apr. 26, 1993 [JP] Japan .................................. 5-120405

[51] Int. Cl.$^6$ ...................................................... G11B 7/00
[52] U.S. Cl. ............................... 369/116; 369/54; 369/58
[58] Field of Search ............................... 369/32, 116, 54, 369/48, 58, 124, 47

[56] References Cited

U.S. PATENT DOCUMENTS

| | | | |
|---|---|---|---|
| 4,512,005 | 4/1985 | Okamo | 360/65 |
| 5,021,894 | 6/1991 | Naito et al. | 360/46 |
| 5,050,156 | 9/1991 | Barton | 369/116 |
| 5,072,435 | 12/1991 | Bakx | 369/116 |
| 5,185,733 | 2/1993 | Finkelstein et al. | 369/54 |
| 5,341,360 | 8/1994 | Johann et al. | 369/58 |
| 5,353,270 | 10/1994 | Iimura | 369/116 |

FOREIGN PATENT DOCUMENTS

| | | |
|---|---|---|
| 0363551 | 4/1990 | European Pat. Off. . |
| 61-99906 | 5/1986 | Japan . |
| 64-27007 | 1/1989 | Japan . |
| 189080 | 4/1989 | Japan . |

Primary Examiner—Nabil Z. Hindi
Attorney, Agent, or Firm—Cooper & Dunham LLP

[57] ABSTRACT

It is an object of the present invention to reduce a data error ratio in the mark edge recording method. In this invention, a corrected value of a record pulse is set by checking the data recording characteristics of an optically recording medium. For this reason, it is possible to adjust a length of a record mark to a specified value as well as to suppress errors such as data errors when data is regenerated.

41 Claims, 10 Drawing Sheets

FIG. 5A
FIG. 5B
FIG. 5C
FIG. 5D
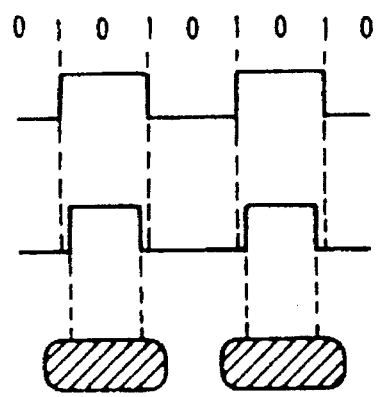
FIG. 5E
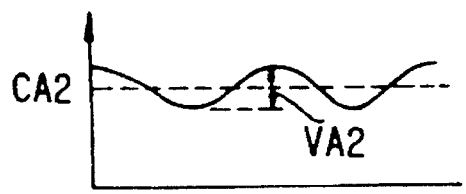
FIG. 6A
FIG. 6B
FIG. 6C
FIG. 6D
FIG. 6E
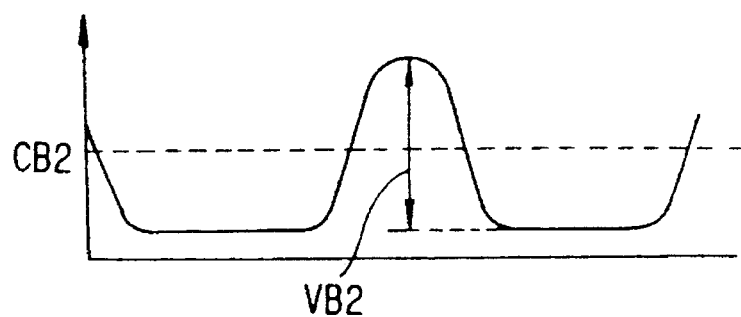

FIG. 7A
FIG. 7B
FIG. 7C
FIG. 7D
FIG. 7E
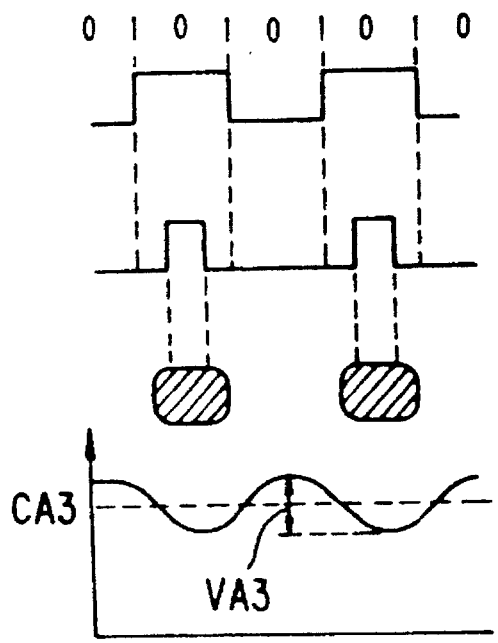
FIG. 8A
FIG. 8B
FIG. 8C
FIG. 8D
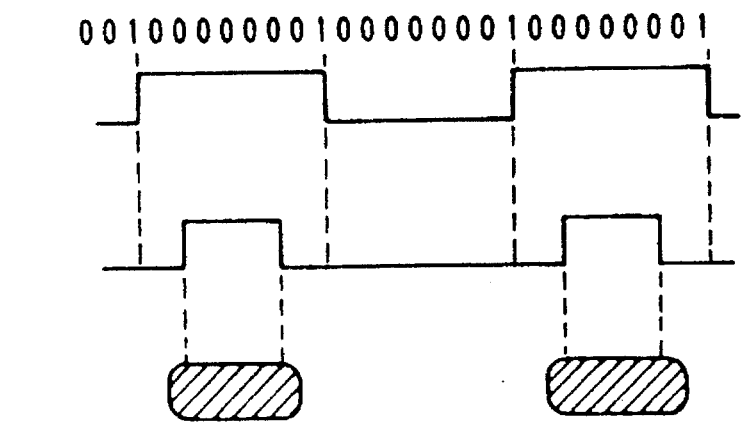
FIG. 8E
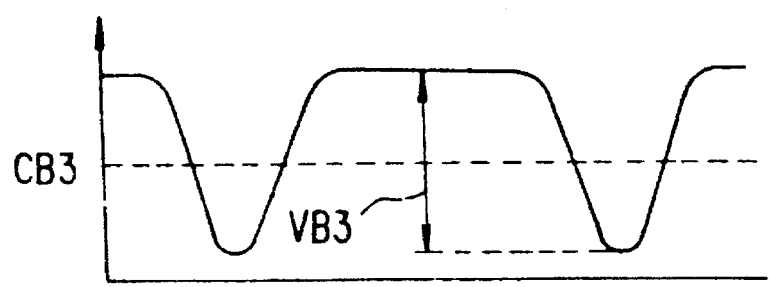

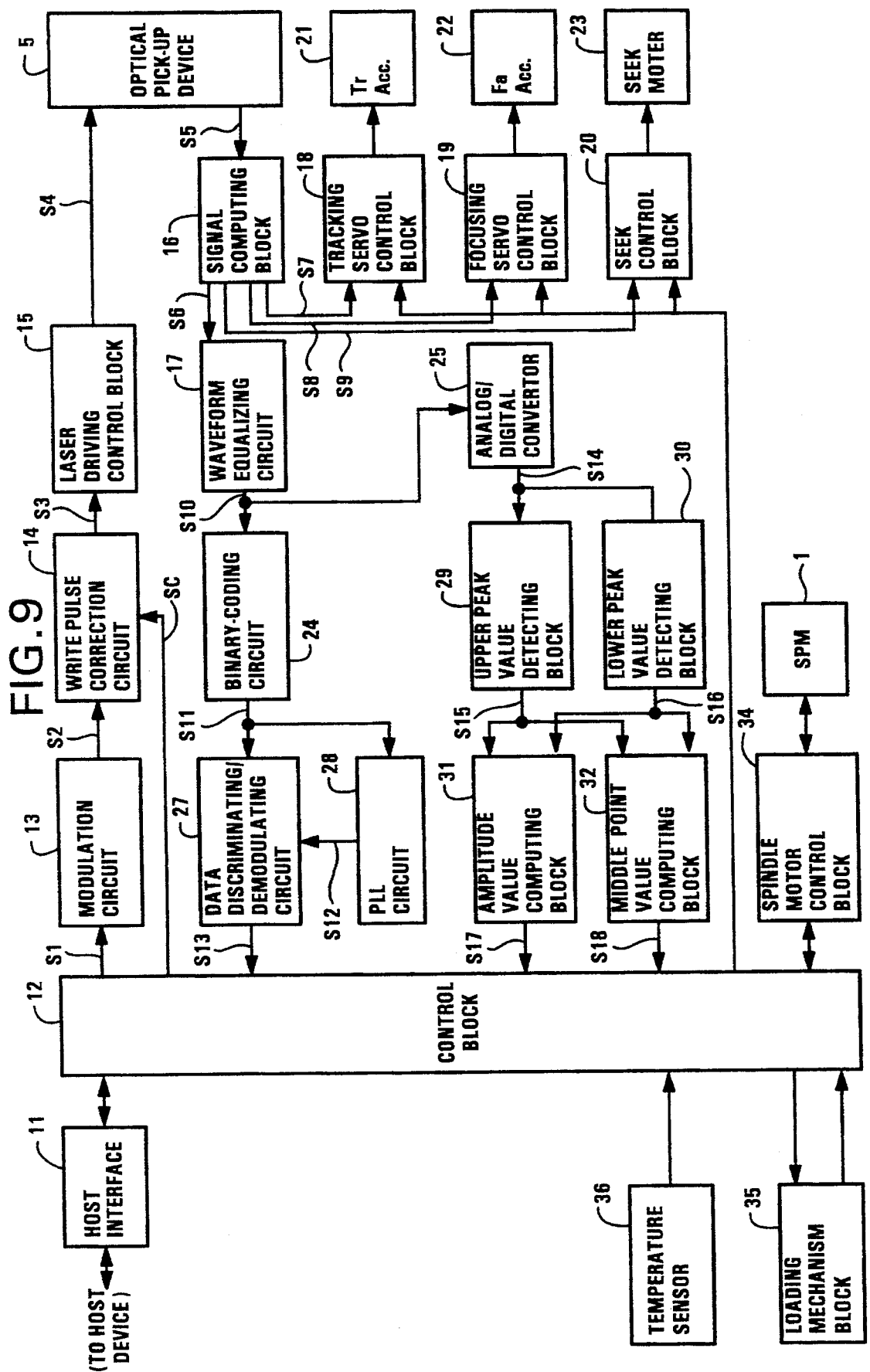

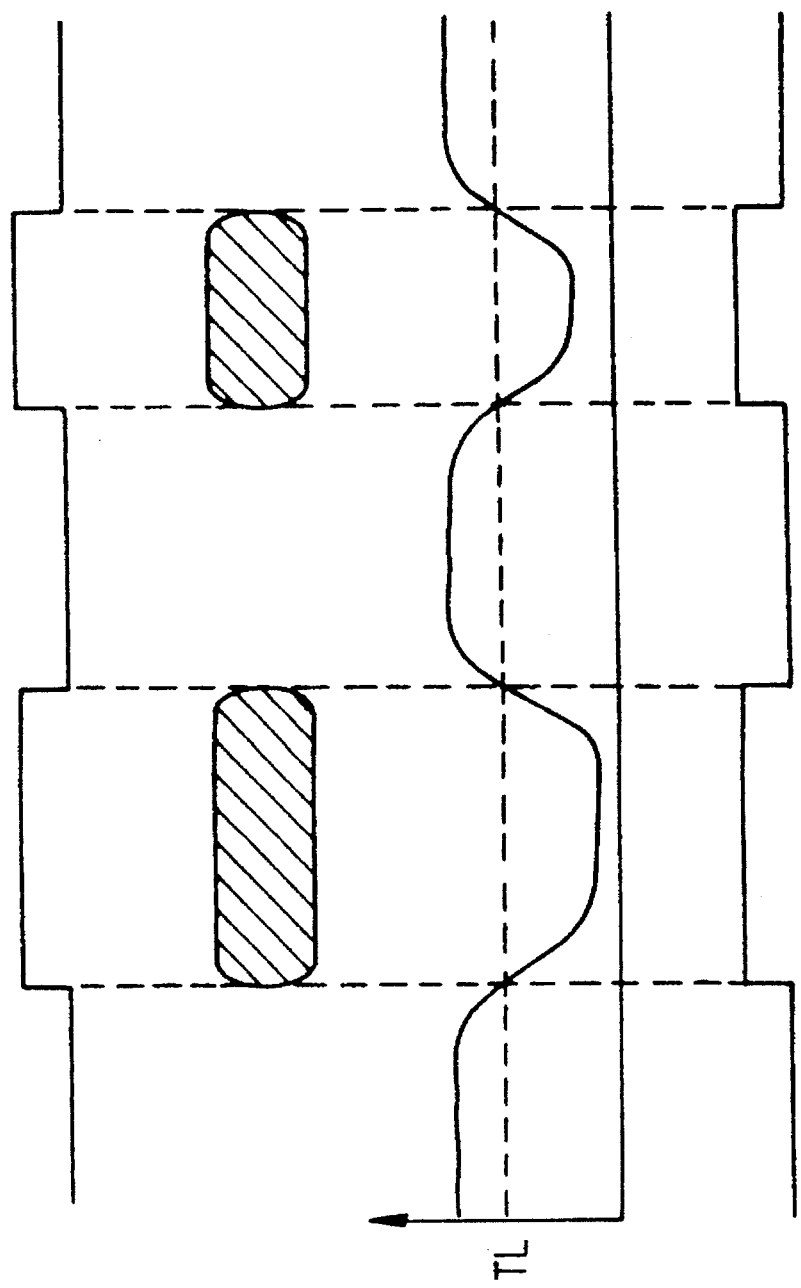

FIG.14A
FIG.14B
FIG.14C
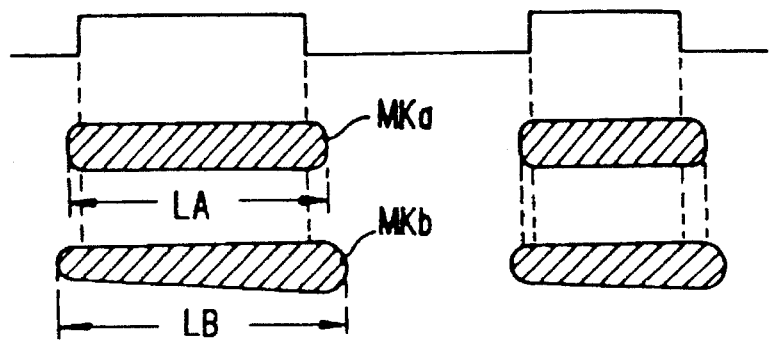
FIG.15A
FIG.15B
FIG.15C
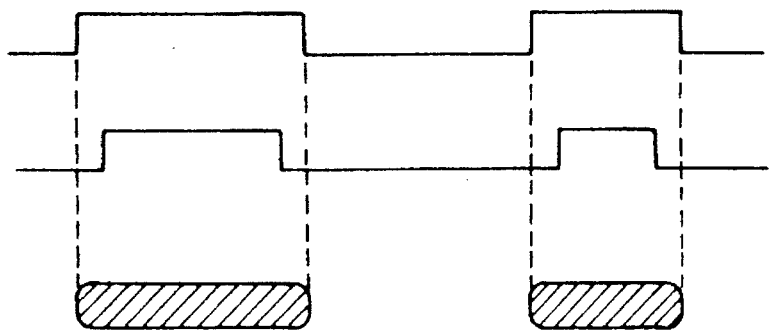

METHOD FOR CONTROLLING AN OPTICAL RECORDING DEVICE FOR IMPROVED RECORDING MARK DETECTION

FIELD OF THE INVENTION

The present invention relates to a method of controlling an optical recording method using an exchangeable optical recording medium as a recording medium and also executing an operation for recording data in the state where a pulse width of recording pulse has been corrected from a pulse width in recording modulation when recording data.

BACKGROUND OF THE INVENTION

In an optical disk device using an exchangeable disk-like optically recording medium such as an optical magnetic disk (called optical disk herein after) as a recording medium, the mark edge recording method (mark length recording method) has been used as a method of recording data in high density.

In this mark edge recording method, for instance, as shown in FIGS. 13 (a) to (c), after data to be recorded is modulated according to the RLL (1, 7, 2, 3) modulation rules, a record signal (record pulse) is formed by applying the NRZI modulating method to the modulate data to be recorded, and a record mark corresponding to the record signal is formed in an optical disk by driving a semiconductor laser element in an optical pick-up device according to the record signal, thus the data being recorded.

Also a regenerative signal obtained by regenerating the record mark (Refer to FIG. 13 (d)) is converted to a binary coded pulse (Refer to FIG. 13 (e)) by subjecting the signal to a binary-coding with a specified threshold value, and the data to be recorded is regenerated according to a position of an edge position of this binary-coded pulse.

By the way, an optical disk mounted on an optical disk differs in terms of its material, for instance, according to the manufacturer, so that the thermal conductivity is dispersed to some extent in (for instance, rated) tolerance. Also the same type of optical disk from the same manufacture may differ in terms of the thermal conductivity to some extent.

Thus the thermal conductivity of each optical disk is heterogeneous, so that sometimes the troubles as described below occur.

Namely, as shown in FIG. 14 (a), when a record pulse having a certain pulse width is loaded to a semiconductor laser element, a record mark MKa as shown in FIG. 14 (b) is formed in an optical disk having a small thermal conductivity, while a record mark MKb as shown in FIG. 14 (c) is formed in an optical disk having a large thermal conductivity.

Herein, when the thermal conductivity is large, a range heated by a laser beam spot becomes larger as compared to that when the thermal conductivity is small, so that the length LB of the record mark MKb become larger than that of the record mark MKa, and as a result the mark edge can not be detected correctly when the data is regenerated, which sometimes causes a data error.

For this reason, to solve the trouble as described above, for instance, as shown in FIG. 15 (a) to FIG. 15 (c), a system has been proposed in which a corrected record pulse having a reduced pulse width is formed and a length of a record mark is adjusted to an appropriate a value by using the corrected record pulse to record the data.

In the conventional type of device as described above, however, a length of a record mark can be adjusted to a value near the theoretical value in particular types of optical disk, but it is impossible in some types of optical disk, data error can not be eliminated.

SUMMARY OF THE INVENTION

It is an object of the present invention to provide an optical recording device controlling method which makes it possible to adjust a length of a record mark to the theoretical value when recording data irrespective of a state of an optical disk.

A method according to the present invention of controlling an optical recording method, which uses an exchangeable optical recording method as a recording medium and executes an operation to record data in a state where a pulse width of a record pulse has been corrected from a pulse width in record modulation when recording data, comprises the steps of recording a first record pattern having a short record mark length and a second record pattern having a long record mark length in a specified area of the optical recording medium respectively, regenerating the first record pattern and the second record pattern to detect a first amplitude value corresponding to an amplitude of a regenerative signal for the first record pattern as well as a second amplitude value corresponding to an amplitude of a regenerative signal for the second record pattern, and setting a corrected value of the pulse width of the record pulse so that a quotient obtained by dividing the first amplitude value by the second amplitude value will becomes equal to or larger than a specified value.

Also the method according to the present invention of controlling an optical recording method which uses an exchangeable optical recording method as a recording medium and executes an operation to record data in a state where a pulse width of a record pulse has been corrected from a pulse width in record modulation when recording data, comprises an initial set-up process for setting a corrected value of a record pulse to a specified initial value, an amplitude value checking process for detecting a first amplitude value corresponding to an amplitude of a regenerative signal for the first record pattern and a second amplitude value corresponding to an amplitude of a regenerative signal for the second record pattern by recording a first record pattern having a short record mark length and a second record pattern having a long record mark length in a specified area of an optical recording medium respectively and regenerating the first record pattern as well as the second record pattern, an amplitude value ratio discriminating process for checking that a quotient obtained by dividing the first amplitude value obtained in the amplitude value checking process above by the second amplitude value is equal to or larger than a specified value, and a process for repeating the amplitude value checking process described above after setting the corrected value of the record pulse if the quotient obtained in the amplitude value ratio discriminating process is smaller than a specified value.

Also the method according to the present invention of controlling an optical recording method which uses an exchangeable optical recording method as a recording medium and executes an operation to record data in a state where a pulse width of a record pulse has been corrected from a pulse width in record modulation when recording data comprises steps of recording a first record pattern having a short record mark length and a second record pattern having a long record mark length in a specified area of an optical recording medium respectively, regenerating the first record pattern and the second record pattern respectively to detect a first middle point value corresponding to a middle point of an envelop of a regenerative signal for the first record pattern and a second middle point value corresponding to a middle point of an envelop of a regenerative signal for the second record pattern, and setting a corrected value of a pulse width of a record pulse so that a difference value obtained by subtracting the second middle point value from the first middle point value is not more than a specified value.

Also the method according to the present invention of controlling an optical recording method which uses an exchangeable optical recording method as a recording medium and executes an operation to record data in a state where a pulse width of a record pulse has been corrected from a pulse width in record modulation when recording data, comprises an initial set-up process for setting a corrected value of a record pulse to a specified initial value, a middle point value detecting process for detecting a first middle point value corresponding to a middle point of an envelop of a regenerative signal for the first record pattern and a second middle point value corresponding to a middle point of an envelop of a regenerative signal for the second record pattern by recording a first record pattern having a short record mark length and a second record pattern having a long record mark length in a specified area of an optical recording medium respectively and regenerating the first record pattern and the second record pattern respectively, a middle point value discriminating process for checking that an absolute value of a difference obtained by subtracting the first middle point value obtained in the middle point value checking process described above from the second middle point value is not more than a specified value, and a process for resetting the corrected value of the record pulse, when the absolute value of the difference obtained in the middle point difference discriminating process is larger than the specified value, to a value smaller by a specified 1 step if a sign of the above difference is positive, or to a value larger by a specified 1 step if a sign of the difference is negative, and then repeating the middle point value checking process described above.

Also the method according to the present invention of controlling an optical recording method which uses an exchangeable optical recording method as a recording medium and executes an operation to record data in a state where a pulse width of a record pulse has been corrected from a pulse width in record modulation when recording data comprises an initial set-up process for setting a corrected value of a record pulse to a specified initial value, an amplitude middle point value checking process for detecting a first amplitude value corresponding to an amplitude of a regenerative signal for the first record pattern and a second amplitude value corresponding to an amplitude of a regenerative signal for the second record pattern and also detecting a first middle point value corresponding to a middle point of an envelop of a regenerative signal for the first record pattern and a second middle point value corresponding to a middle point of an envelop of a regenerative signal for the second record pattern, an amplitude ratio discriminating process for checking that a quotient obtained by dividing the first amplitude value obtained in the amplitude middle value checking process described above by the second amplitude value is equal to or more than a specified value, a middle point value difference discriminating process for checking that an absolute value of the difference obtained by subtracting the first middle point value obtained in the amplitude value middle point value checking process from the second middle point value is not more than a specified value, and a process for repeating the amplitude value checking process, when it is determined that the quotient obtained in the amplitude value ratio discriminating process above is neither equal to nor more than the specified value and simultaneously when it is determined that the absolute value of the difference obtained in the middle point difference discriminating process obtained in the middle point difference discriminating process is not equal to nor less than the specified value, after resetting the corrected value of the record pulse to a value smaller by a specified 1 step if a sign of the above difference is positive, or to a value larger by a specified 1 step if a sign of the difference is negative. A series of processes should preferably be executed just after power for the device is turned on.

As described above, the optical recording device according to the present invention checks data recording characteristics of an optical recording medium mounted thereon and sets up a corrected value of a record pulse, so that the device can adjust a length of a record mark to a specified length and also can suppress such errors as a data error when the data is regenerated.

As described above, with the present invention, data recording characteristics of an optical recording medium set therein is checked before a corrected value of a record pulse width is set, so that a length of a record mark can be set to a specified value, and also such effects as suppressing data errors during regeneration of data are provided.

Other objects and features of this invention will become understood from the following description with reference to the accompanying drawings.

BRIEF DESCRIPTION OF THE DRAWINGS

FIGS. 5 (a–e) schematic views explaining a principle of the principle (when a corrected value of a pulse width is too large);

FIGS. 6 (a–e) schematic views explaining a principle of the present invention (when a corrected value of a pulse width is too large);

FIGS. 7 (a–e) schematic views explaining a principle of the present invention (when a corrected value of a pulse width is too small);

FIGS. 8 (a–e) are schematic view explaining a principle of the present invention (when a corrected value of a pulse width is too small);

FIG. 9 is a block diagram illustrating a key section of a control system of an optical magnetic device according to an embodiment of the present invention;

FIGS. 13 (a–e) are explanatory views for a mark edge recording method;

FIGS. 14 (a–c) are schematic views explaining disadvantageous points in the conventional type of device; and FIGS. 15 (a–c) are schematic views explaining disadvantageous points of the conventional type of device.

DESCRIPTION OF THE PREFERRED EMBODIMENTS

Now description is made hereinafter for embodiments of the present invention with reference to the related drawings.

Figure 1:
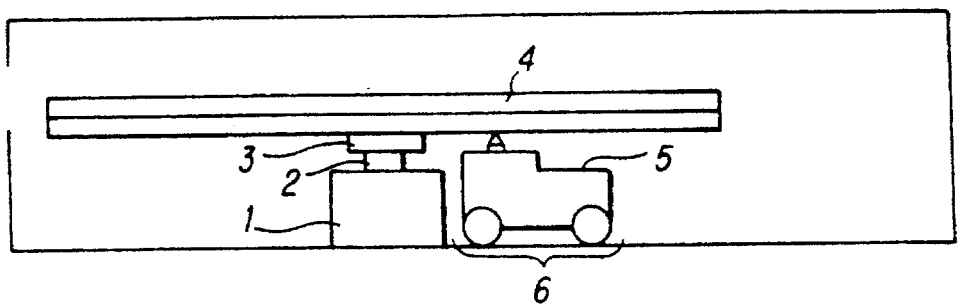
FIG. 1 is a schematic view illustrating configuration of a key section of an optical magnetic disk according to an embodiment of the present invention.

FIG. 1 shows configuration of a key section of an optical magnetic disk device according to an embodiment of the present invention. It should be noted that sections of this device not directly relating to the present invention (such as the magnetic head mechanism) are not shown herein.

In this figure, an optical magnetic disk 4 is removably mounted on a turn table 3 tightly set on a rotating shaft of a spindle motor 1, and data is recorded, regenerated on or deleted from a recording surface of this optical magnetic disk 4 by an optical pick-up device 5. Also on this optical pick-up device is provided a seek mechanism 6 which moves in the radial direction of the optical magnetic 4.

Also the magnetic disk 4 is treated in the state where the magnetic disk 4 is packaged in a disk cartridge (not shown herein). Also on this optical magnetic disk is provided a loading mechanism (not shown herein) for locating a disk cartridge as well as the optical magnetic disk 4 at specified positions respectively and also discharging them. Also on the optical pick-up device 5 are provided a known optical system as a light source such as a semiconductor laser element which generates a laser beam, a known object glass system for focusing a laser beam onto a recording surface of the optical magnetic disk 4, a known optical detection system for receiving a reflected light from the optical magnetic disk 4 and forming various types of signal, and other required components if any. Also to the object glass system is attached a known object glass mechanism for moving the object glass in the focusing direction as well as in the tracking direction.

Figure 2A:
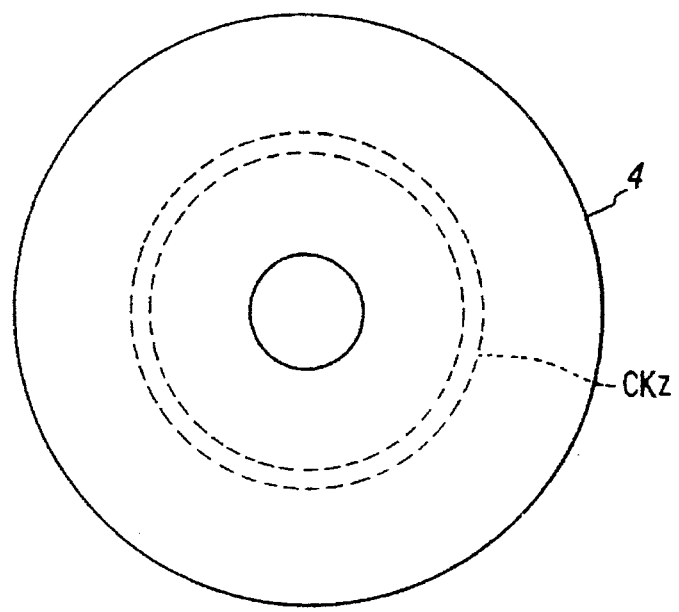
FIG. 2A is a schematic view illustrating an example of a format of a recording area in an optical magnetic disk.

As shown in FIG. 2A, a checking area CKz which can be used for such a purpose as checking data recording conditions is provided at a specified position in a recording area of the optical magnetic disk 4.

Figure 2B:
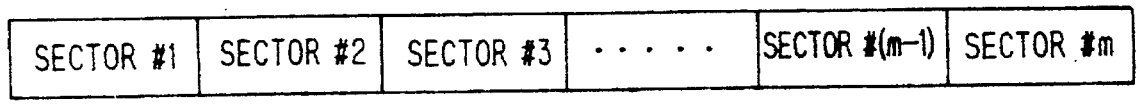
FIG. 2B is a schematic view illustrating an example of a format of a recording area in an optical magnetic disk.
Figure 2C:
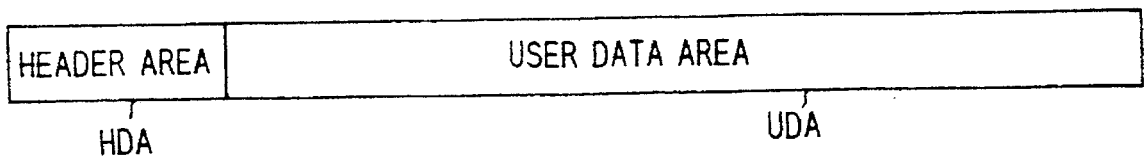
FIG. 2C is a schematic view illustrating an example of a format of a recording area in an optical magnetic disk.

Also on a recording surface of the optical magnetic disk 4 are formed at a specified space a number of recording tracks, and in each of the recording tracks are formed a specified number m of sectors as shown in FIG. 2B. Also each of the sectors comprises a sector address used for recognizing the address, a header area HDA in which flag data indicating a data recording state or others is recorded, and a user data area UDA in which user data can be recorded, as shown in FIG. 2C.

Also in this embodiment, a corrected value of a pulse width of a record pulse when data is recorded is decided as described below.

For instance, in a case where, after data to be recorded is modulated according to the modulation rule of RLL (1, 7, 2, 3), a record pulse (NRZI cord data) is formed by applying the NRZI modulation method to the modulated data to be recorded and a record mark corresponding to the record signal is recorded in an optical disk, two types of patterns, a shortest pattern for repeating the record mark and the longest pattern for repeating the record mark, are recorded, and a corrected value most suited to a pulse width of the record pulse when the data is recorded in the optical magnetic disk 4 is selected.

The shortest repeat pattern in the (1, 7, 2, 3) RLL modulation rule is "010101 . . . ", while the longest repeat pattern is "010000000100000001 . . . ".

Figure 3B:
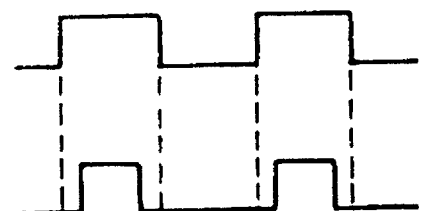
FIGS. 3 are (a–e) schematic views explaining a principle of the present invention (when a corrected value of a pulse width is appropriate)
Figure 3C:
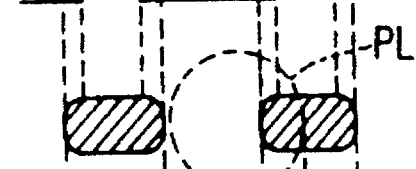
Figure 3D:
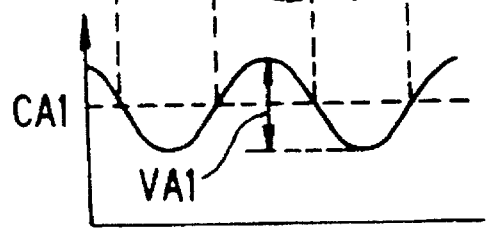

In FIGS. 3 (a) to (e), when the shortest repeat pattern is recorded and the corresponding record mark is formed in the optical magnetic disk 4 in the state that the corrected record pulse (called write pulse hereinafter) has an appropriate pulse width, an amplitude of the regenerative signal is VA1, while a middle point of an envelop of the regenerative signal (an intermediate value of the amplitude) is CA1.

Figure 4B:
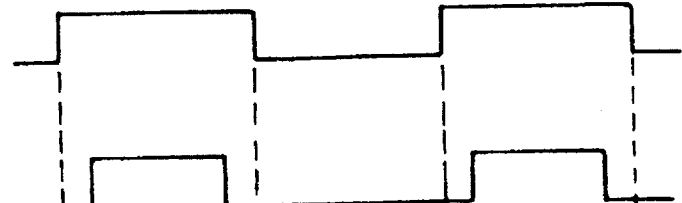
FIGS. 4 (a–e) schematic views explaining a principle of the present invention (when a corrected value of a pulse width is appropriate)
Figure 4C:
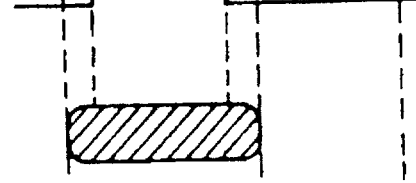
Figure 4D:
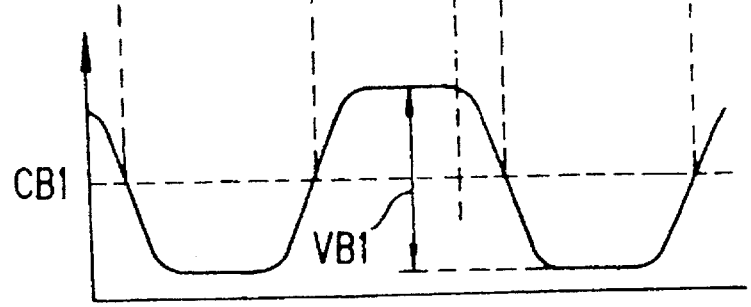

In FIGS. 4 (a) to (e), when the longest repeat pattern is recorded and the corresponding record mark is formed in the optical magnetic disk 4 in the state that the corrected write pulse has an appropriate pulse width, an amplitude of the regenerative signal is VB1, while a middle point of an envelop of the regenerative signal is CB1.

In FIGS. 5 (a) to (e), the shortest repeat pattern is recorded and the corresponding record mark is formed in the optical magnetic disk 4 on the condition that a corrected value of the write pulse has a pulse width which is too small, an amplitude of the regenerative signal is VA2, while a middle point of an envelop of the regenerative signal is CA2.

In FIGS. 6 (a) to (e), when the longest repeat pattern is recorded and the corresponding record mark is formed in the optical magnetic disk 4 on the condition that a corrected value of the write pulse has a pulse width which is too small, an amplitude of the regenerative signal is VB2, while a middle point of an envelop of the regenerative signal is CB2.

In FIGS. 7 (a) to (e), when the shortest repeat pattern is recorded and the corresponding record mark is formed in the optical magnetic disk 4 on the condition that a corrected value of the write pulse has a pulse width which is too large, an amplitude of the regenerative signal is VA3, while a middle point of an envelop of the regenerative signal is CA3.

In FIGS. 8 (a) to (e), when the longest repeat pattern is recorded and the corresponding record mark is formed in the optical magnetic disk 4 on the condition that a corrected value of the write pulse has a pulse width which is too large, an amplitude of the regenerative signal is VB3, while a middle point of an envelop of the regenerative signal is CB3.

Now if (VA1/VB1), (VA2/VB2), and (VA3/VB3) are computed and the quotients are compared to each other, it would be turned out that the quotient of (VA1/VB3) is the largest. At the same time, the relational expressions of CA1=CB1, CA2<CB2 and CA3 CB3 are satisfied.

As described above, by adjusting a corrected value of a pulse width of a record pulse so that a quotient obtained by dividing an amplitude value of a regenerative signal for the shortest repeat pattern by an amplitude value of a regenerative signal for the longest repeat pattern will be the largest, an optimal write pulse can be obtained.

Also by computing a difference between a middle point of an envelop of a regenerative signal for the shortest repeat pattern and a middle point of an envelop of a regenerative signal for the longest repeat pattern, and adjusting a corrected value of the pulse width of the record pulse so that the difference will be included in a specified range, an optimal write pulse can be obtained. If a sign of the difference is positive, it indicates that the corrected value is too large, and the corrected value of the pulse width can be adjusted to the substantially optimal value by reducing the corrected value of the pulse width. If a sign of the difference is negative, it indicates that the corrected value is too small, and the corrected value can be adjusted to the substantially optimal state by increasing the corrected value of the pulse width.

FIG. 9 shows a key section of a control block of an optical magnetic disk device according to an embodiment of the present invention.

In this figure, a host interface 11 is connected to a host device (not shown herein) which used as an external device for transaction of various types of recorded/regenerated data as well as various types of control data between the host device and a control block 12.

The control block 12 is used to control operations of each block in this optical magnetic disk device, as well as to control data transaction between the control block 12 and the host device. A modulation circuit 13 modulates data to be recorded S1 outputted from the control block 12 according to a specified modulation rule (such as the (1,7,2,3) RLL), and the output is added as a record pulse S2 to a write pulse correction circuit 14.

The write pulse correction circuit 14 is used to correct a pulse width of the record pulse S2 according to pulse width correction data SC being added from the control block 12, and the output is sent as a write pulse S3 to a semiconductor laser driving control block 15.

The semiconductor laser driving control block 15 outputs a record current S4 modulated according to the write pulse S3, and the record current S4 is also added to a semiconductor laser element of the optical pick-up device 5.

Various types of light receiving signal S5 detected by the optical detection system in the light pick-up device 5 are sent to a signal computing block 16. The signal computing block 16 computes a specified regenerative signal S6, a tracking error signal S7, a focusing error signal S8, and a sector address signal S9 by subjecting the light receiving signals S5 to a specified computing process with the regenerative signal S6 sent to a waveform equalizing circuit 17, tracking error signal S7 to a tracking servo control block 18, focusing error signal S8 to a focusing servo control block 19, and sector address signal S9 to a seek control block 20.

The tracking servo control block 18 executes tracking servo control for tracking a laser beam in a recording track of the optical magnetic disk 4, and controls operation of a tracking actuator 21 in the object glass moving mechanism in the direction where a value of the tracking error signal S7 becomes closer to 0 (zero). Also the tracking servo control block 18 transacts various types of signal with the control block 2.

The focusing servo control block 19 executes focusing servo control for adjusting a focus of a laser beam onto a recording track of the optical magnetic disk 4, and controls operation of a focusing actuator 22 of the object glass moving mechanism in the direction where a value of focusing error signal S8 becomes closer to 0 (zero). Also the focusing servo control block 19 transacts various types of signal with the control block 12.

The seek control block 20 locates a laser beam onto a recording track instructed from the control block 12, detects a positional error between the actual position of the laser beam and the recording track instructed according to the sector address signal S9, and drives a seek motor 23 of the seek mechanism 6 in the direction where the positional error becomes closer to 0 (zero). Also the seek control block 20 notifies the control block 12 of completion of operation for seeking.

The waveform equalizing circuit 17 forms a signal by eliminating effects such as inter-waveform interference from the regenerative signal S6, and the output is sent as a complementary regenerative signal S10 to a binary-coding circuit 24 and an analog/digital convertor 25.

The binary-coding circuit 24 converts the complementary regenerative signal S10 to binary-coded data, and the output is sent as a binary-coded pulse S11 to a data discriminating/demodulating circuit 27 and to a PLL circuit 28.

The PLL circuit 28 forms a clock signal S12 phase-synchronized to the binary-coded pulse S11, and the clock signal S12 is sent to the data discriminating/demodulating circuit 27.

The data discriminating/demodulating circuit 27 samples the binary-coded pulse S11 in synchronism to the clock signal S12, regenerates the data according to a result of the sampling, demodulates the regenerated data, and forms regenerated data S13, and the regenerated data S13 is sent to the control block 12.

The analog/digital convertor 25 converts the complementary regenerative signal S10 to a corresponding digital signal, and the output is sent as a digital regenerative signal S14 to an upper peak value detecting block 29 and a lower peak value detecting block 30.

The upper peak value detecting block 29 detects a peak value at an upward convex portion of one amplitude of the digital regenerative signal S14, and the output is sent as a detected upper peak value S15 to an amplitude value computing block 31 and a middle point value computing block 32.

The lower peak value detecting block 30 detects a peak value at a downward convex portion of one amplitude of the digital regenerative signal S14, and the output is sent as a detected lower peak value S16 to the amplitude value computing block 31 and the middle point value computing block 32.

The amplitude value computing block 31 computes an amplitude value of the digital regenerative signal S14 according to the detected upper peak value S15 and the detected lower peak value S16, and the output is sent as a detected amplitude value S17 to the control block 12.

The middle point computing block 32 computes a level of a middle point of an envelop of the digital regenerative signal S14 according to the detected upper peak value S15 and the detected lower peak value S16, and the output is sent as a detected middle point value S18 to the control block 12.

A spindle motor control block 34 controls operation of the spindle motor 1, while the loading mechanism block 35 is an electric system included in the loading mechanism, and a detection signal for detecting states of various types of marks added to, for instance, a media sensor which detects that the optical magnetic disk 4 has been set therein or a disk cartridge is outputted from the loading mechanism 35 to the control block 12. Also a temperature sensor 36 detects a temperature near a place where the optical magnetic disk 4 is set, and the detected value is sent to the control block 12.

With the configuration as described above, the control block 12 makes it possible to form an optimal record mark according to characteristics of the optical magnetic disk 4 and state of the semiconductor laser element by executing a write pulse correcting processing when it is detected that the optical magnetic disk 4 has been set therein just after power for the optical magnetic disk was turned on, when it is detected that the optical magnetic disk 4 has been set therein after the optical magnetic disk 4 was once discharged, and when it is detected that a value detected by the temperature sensor 36 indicates that the temperature is in a range where some influence will appear in formation of a record mark.

Figure 10:
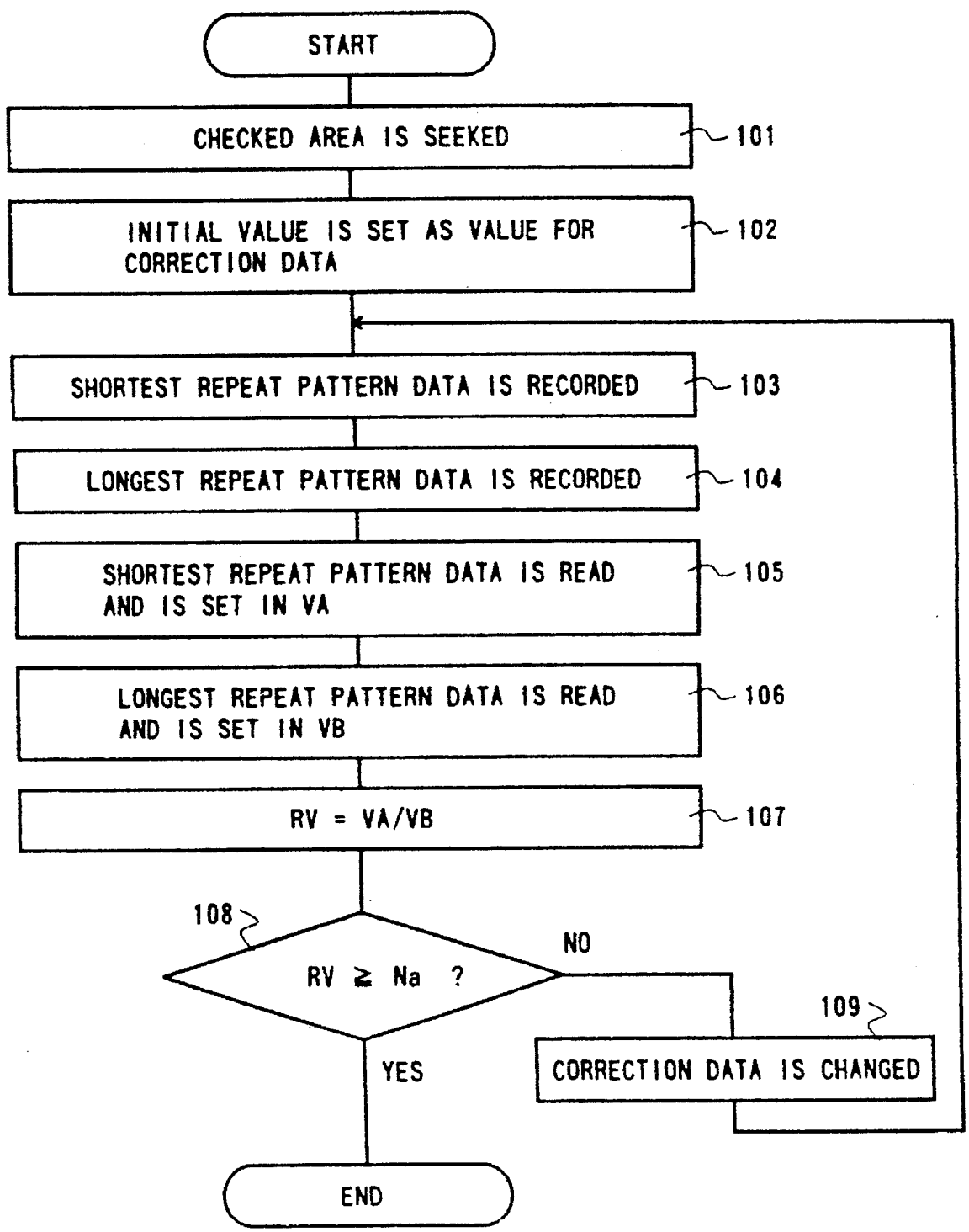
FIG. 10 is a flow chart illustrating an example of a write pulse correcting process executed by the control block.

An example of write pulse correcting process executed by the control block 12 then is shown in FIG. 10.

In this figure, a checking area CKz set up in the optical magnetic disk 4 is seeked (Process 101), and a specified initial value is set as a value for the pulse width correction data SC (process 102).

In this state, the aforesaid shortest repeat pattern data is recorded by a specified number of sectors (process 103), and then the aforesaid longest repeat pattern data is recorded by a specified number of sectors (process 104).

Then a data read operation is executed to the sectors in which the shortest repeat pattern data recording was recorded, the detected amplitude value S17 then is set in a parameter VA (process 105). At the same time data read operation is executed to the sectors in which the longest pattern data was recorded, and the detected amplitude value S17 then is set in a parameter VB (process 106).

Then, a quotient obtained by dividing a value of the parameter VA by a value of the parameter VB is set in a parameter RV, and whether a value of the parameter RV is greater then or equal to a specified value Na (decision 108) or not is checked.

If a result of the division 108 is YES, it indicates that a value of the pulse width correction data SC is appropriate, and this operation is terminated. If a result of the decision 108 is NO, it indicates that a value of the pulse width correction data sC is not appropriate, the value of the pulse width correction data SC is changed by a specified value (process 109), and system control returns to the process 103 to execute the checking operations described above again.

Figure 11:
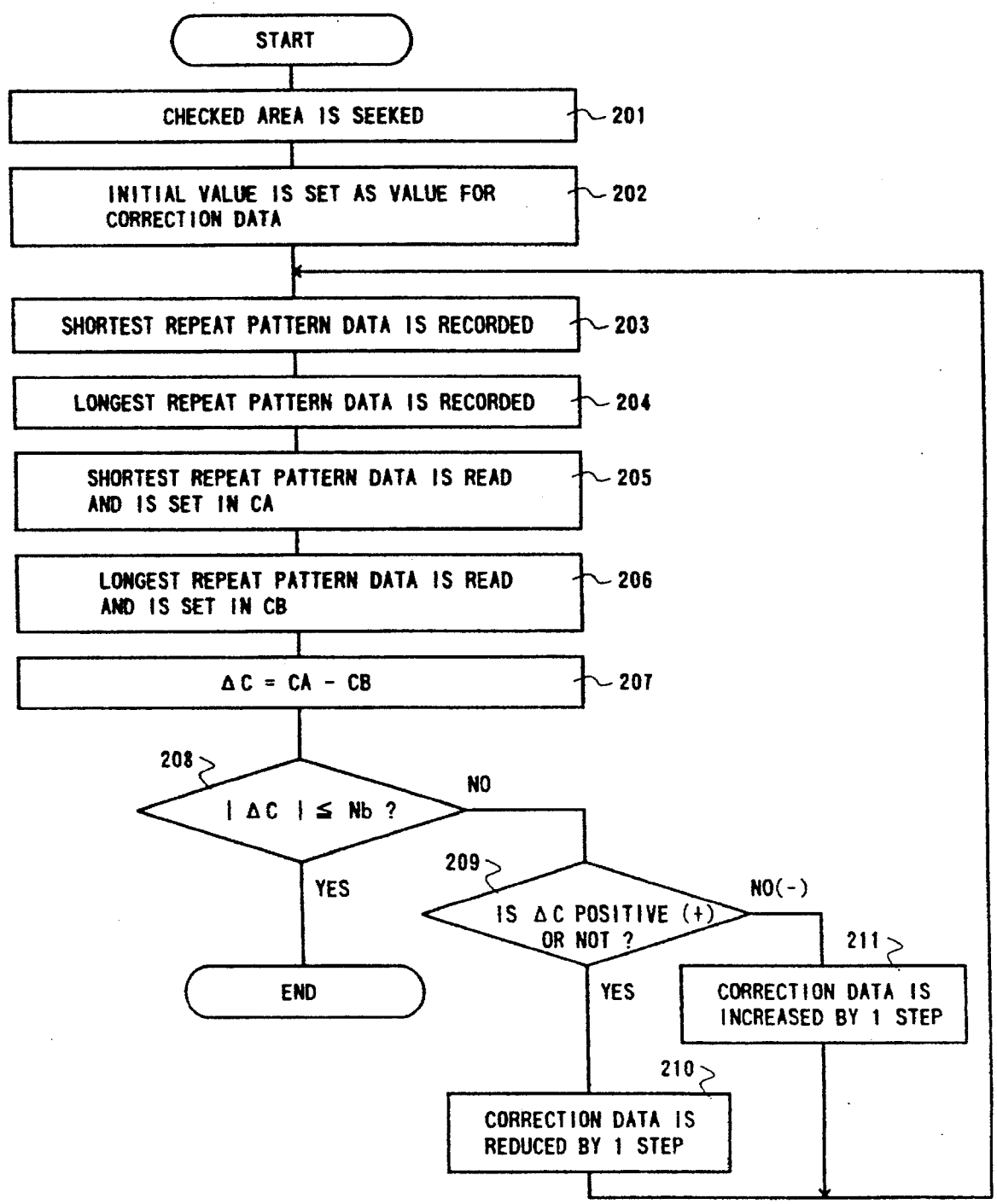
FIG. 11 is a flow chart illustrating another example of a write pulse correcting process executed by the control block.

FIG. 11 shows another example of write pulse correcting process executed by the control block 12.

In this figure, the checking area CKz arranged in the optical magnetic disk 4 is seeked (process 201), and a specified initial value is set in a value of the pulse width correction data SC (process 202).

In this state, the aforesaid shortest repeat pattern data is recorded by a specified number of sectors (process 203), and then the aforesaid longest repeat pattern is recorded by a specified number of sectors (process 204).

Then a data read operation is executed to the sectors in which the shortest repeat pattern data recording was recorded, and the detected middle point value S18 is set in a parameter CA (process 205). Also the data read operation is executed to the sectors in which the longest repeat pattern data was recorded, and the detected middle point value S18 is set in a parameter CB (process 206).

Then, a difference obtained by subtracting a value of the parameter CB from a value of the parameter CA is set in a parameter ΔC (process 207), and whether an absolute value of the parameter ΔC is less more than a specified value Nb or not is checked (decision 208). If a result of the decision 208 is YES, it indicates that a value of the pulse width correction data SC is appropriate, and the operation is terminated.

If a result of the decision 208 is NO, whether a sign of a value of the parameter Ac is positive (+) or not is checked (decision 209). If a result of the decision 209 is YES, it indicates that the corrected value of the pulse width is too large, and the value of the pulse width correction data SC is reduced by a specified 1 step (process 210). The system control then returns to the process 203 to again execute the checking operations described above. If a result of the decision 209 is NO, it indicates that the corrected value of the pulse width is too small, and the value of the pulse width correction data SC is increased by a specified 1 step (process 211). The system control then returns to the process 203 to again execute the checking operations described above.

Figure 12:
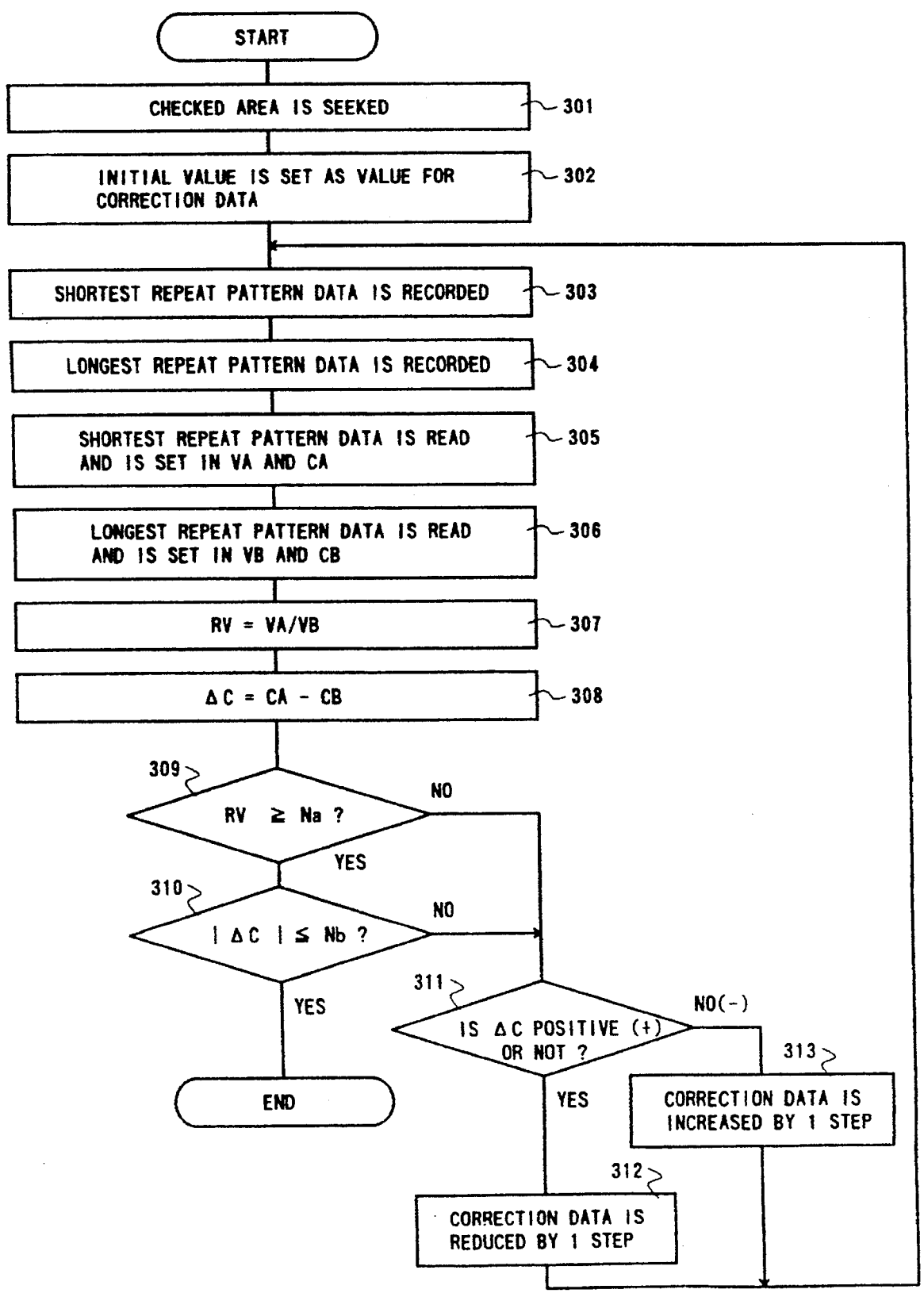
FIG. 12 is a flow chart illustrating still the other example of a write pulse correcting process executed by the control block.

FIG. 12 shows a still further different example of the write pulse correcting process executed by the control block 12.

In this figure, the checking area CKz arranged in the optical magnetic disk 4 is seeked (process 301), and a specified initial value is set in a value of the pulse width correction data SC (process 302).

In this state, the aforesaid shortest repeat pattern data is recorded by a specified number of sectors (process 303), and then the aforesaid longest repeat pattern data is recorded by a specified number of sectors (process 304).

Then, a data read operation is executed to the sectors in which the shortest repeat pattern data was recorded, and the detected amplitude value S17 then is set in a parameter VA, and also the detected middle point value S18 is set in the parameter CA (process 305). Then, and data read operation is executed to the sectors in which the longest repeat pattern data was recorded, and the detected amplitude value S17 is set in the parameter VB, and also the detected middle point value S18 is set in the parameter CB (process 306).

Then a quotient obtained by dividing a value of the parameter VA by a value of the parameter VB is set in a parameter RV (process 307), and a difference obtained by subtracting a value of the parameter CB from a value of the parameter CA is set in the parameter ΔC (process 308).

And whether the value of the parameter RV is equal to or more than a specified value Na or not is checked (decision 309). If a result of the decision 309 is YES, then whether an absolute value of the parameter ΔC is less than or equal to a specified value Nb or not is checked (decision 310). If a result of the decision 310 is YES, it indicates that the value of the pulse width correction data SC is appropriate, and the operation is terminated.

If a result of the decision 309 is NO, or if a result of the decision 310 is NO, whether a sign of the value of the parameter ΔC is positive (+) or not is checked (decision 311). If a result of the decision 311 is YES, it indicates that the corrected value of the pulse width is too large, and the value of the pulse width correction data SC is reduced by a specified 1 step (process 312). The and the system then control returns to the process 303 to again execute the checking operations described above. If a result of the decision 311 is NO, it indicates that the corrected value of the pulse width is too small, and the value of the pulse width correction data SC is increased by a specified 1 step (process 313). The system control then returns to the process 303 to again execute the above checking operations described above.

It should be noted that, as a plurality of recording tracks are arranged in the checking area CKz on the optical magnetic disk 4, the checking operation should preferably be executed to another recording track after the value of the pulse width correction data is changed.

Although an operation for adjusting the pulse width correction data SC is executed using the shortest repeat pattern as well as the longest repeat pattern in the embodiment described above, this adjusting operation can be executed in parallel during the normal operation for recording data (operation for verifying).

Also description of the above embodiment assumes a case where the (1, 7, 2, 3) RLL modulation rules is used, but the present invention can similarly be applied also in a case where other modulation rules are used.

Also the description of the above embodiment assumes a case where the present invention is applied to an optical magnetic disk, but also the present invention can similarly be applied to a phase-change type of optical disk device or an successively writing type of optical disk device.

Also in the embodiment described above, a checking area for checking characteristics of a medium is arranged in a recording area of an optical magnetic disk, but the present invention can similarly be applied to a case where this checking area is not arranged. In that case, an empty zone in the recording area may be used according to the necessity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of controlling an optical recording device which uses an exchangeable optical recording medium as a recording medium, and which executes an operation to record data in a state where a pulse width of a record pulse has been corrected from a pulse width in record modulation, and which includes an initial set-up method comprising the steps of:

recording a first recording pattern having a short record mark length and a second recording pattern having a long record mark respectively in a specified area of an optical recording medium;

regenerating the first recording pattern and the second recording pattern respectively;

detecting a first amplitude value corresponding to an amplitude of a regenerative signal for the first recording pattern, and a second amplitude value corresponding to an amplitude of a regenerative signal for the second recording pattern; and setting a corrected value of a pulse width of a record pulse so that a quotient obtained by dividing the first amplitude value by the second amplitude value is equal to or larger than a specified value;

wherein said initial set-up method is executed just after power for the device is turned ON.

2. An optical recording device control method according to claim 1, wherein a series of processes started from the initial set-up process are executed when a temperature in a driving system in the optical recording device is equal to or more than a specified value.

3. An optical recording device control method according to claim 1, wherein a series of processes started from the initial set-up process are executed once for every specified period of time while a driving system of the optical recording device is in operation.

4. An optical recording device control method according to claim 1, wherein a series of processes started from the initial set-up process are executed during down time of a controller for controlling a driving system in the optical recording device.

5. An optical recording device control method according to claim 1, wherein a series of processes started from the initial set-up process are executed each time an information recording medium in the optical recording medium is exchanged with a new one.

6. A method of controlling an optical recording device which uses an exchangeable optical recording medium as a recording medium, and which executes an operation to record data in a state where a pulse width of a record pulse has been corrected from a pulse width in record modulation, comprising:

an initial set-up process for setting a corrected value of a record pulse in a specified initial value;

an amplitude value checking process for detecting a first amplitude value corresponding to an amplitude of a regenerative signal for a first record pattern, and a second amplitude value corresponding to an amplitude of a regenerative for a second record pattern, by recording the first recording pattern having a short record mark and the second recording pattern having a long record mark in a specified area of the optical recording medium respectively and regenerating the first recording pattern and the second recording pattern;

an amplitude ratio discriminating process for checking that a quotient obtained by dividing the first amplitude value obtained in the amplitude value detecting process by the second amplitude value is equal to or more than a specified value; and a control process for repeating the amplitude value checking process, when the quotient obtained in the amplitude value ratio discriminating process is smaller than a specified value, after a corrected value of the record pulse is reset.

7. An optical recording device control method according to claim 6, wherein a series of processes started from the initial set-up process is executed just after power for the device is turned ON.

8. An optical recording device control method according to claim 6, wherein a series of processes started from the initial set-up process are executed when a temperature in a driving system in the optical recording device is equal to or more than a specified value.

9. An optical recording device control method according to claim 6, wherein a series of processes started from the initial set-up process are executed once for every specified period of time while a driving system of the optical recording device is in operation.

10. An optical recording device control method according to claim 7, wherein a series of processes started from the initial set-up process are executed during down time of a controller for controlling a driving system in the optical recording device.

11. An optical recording device control method according to claim 7, wherein a series of processes started from the initial set-up process are executed each time an information recording medium in the optical recording medium is exchanged with a new one.

12. A method of controlling an optical recording device which uses an exchangeable optical recording medium as a recording medium, and which executes an operation to record data in a state where a pulse width of a record pulse has been corrected from a pulse width in record modulation, and Which includes an initial set-up method comprising the steps of;

recording a first recording pattern having a short record mark and a second recording pattern having a long record mark in a specified area of the optical recording medium respectively;

regenerating the first recording pattern and the second recording pattern respectively;

detecting a first middle point value corresponding to a middle point of an envelop of a regenerative signal for the first recording pattern, and a second middle point value corresponding to a middle point of an envelop of a regenerative signal for the second recording pattern; and setting a corrected value of a pulse width of a record pulse so that a difference obtained by subtracting the second middle point value from the first middle point value is not more than a specified value.

13. An optical recording device control method according to claim 12, wherein a series of processes started from the initial set-up process are executed just after power for the device is turned ON.

14. An optical recording device control method according to claim 12, wherein a series of processes started from the initial set-up process are executed when a temperature in a driving system in the optical recording device is equal to or more than a specified value.

15. An optical recording device control method according to claim 12, wherein a series of processes started from the initial set-up process are executed once for every specified period of time while a driving system of the optical recording device is in operation.

16. An optical recording device control method according to claim 12, wherein a series of processes started from the initial set-up process are executed during down time of a controller for controlling a driving system in the optical recording device.

17. An optical recording device control method according to claim 12, wherein a series of processes started from the initial set-up process are executed each time an information recording medium in the optical recording medium is exchanged with a new one.

18. A method of controlling an optical recording device which uses an exchangeable optical recording medium as a recording medium, and which executes an operation to record data in a state where a pulse width of a record pulse has been corrected from a pulse width in record modulation, comprising:

an initial set-up process for setting a corrected value of a record pulse in a specified initial value;

a middle point value detecting process for detecting a first middle point value corresponding to a middle point of an envelop of a regenerative signal for a first recording pattern, and a second middle point value corresponding to a middle point of an envelop of a regenerative signal for a second recording pattern, by recording the first recording pattern having a record mark length and the second recording pattern having a long record mark length in a specified area of the optical recording medium respectively and regenerating the first recording pattern and the second recording pattern respectively;

a middle point value difference discriminating process for checking that an absolute value of a difference obtained by subtracting the first middle point value from the second middle point value in the middle point value detecting process is not more than a specified value; and a control process for repeating the middle point value detecting process, when the absolute value of the difference detected in the middle point difference discriminating process is equal to or more than a specified value, after the corrected value of the record pulse is reset according to a sign (positive or negative) of the difference.

19. An optical recording device control method according to claim 18, wherein a series of processes started from the initial set-up process are executed just after power for the device is turned ON.

20. An optical recording device control method according to claim 18, wherein a series of processes started from the initial set-up process are executed when a temperature in a driving system in the optical recording device is equal to or more than a specified value.

21. An optical recording device control method according to claim 18, wherein a series of processes started from the initial set-up process are executed once for every specified period of time while a driving system of the optical recording device is in operation.

22. An optical recording device control method according to claim 18, wherein a series of processes started from the initial set-up process are executed during down time of a controller for controlling a driving system in the optical recording device.

23. An optical recording device control method according to claim 18, wherein a series of processes started from the initial set-up process are executed each time an information recording medium in the optical recording medium is exchanged with a new one.

24. A method of controlling an optical recording device which uses an exchangeable optical recording medium as a recording medium, and which executes an operation to record data in a state where a pulse width of a record pulse has been corrected from a pulse width in record modulation, comprising:

an initial set-up process for setting a corrected value of a record pulse in a specified initial value;

a middle point value detecting process for detecting a first middle point value corresponding to a middle point of an envelop of a regenerative signal for a first recording pattern, and a second middle point value corresponding to a middle point of an envelop of a regenerative signal for a second recording pattern, by recording the first recording pattern having a short record mark length and the second recording pattern having a long record mark length in a specified area of the optical recording medium respectively and regenerating the first recording pattern and the second recording pattern respectively;

a middle point value difference discriminating process for checking that an absolute value of a difference obtained by subtracting the first middle point value obtained in the middle point value checking process from the second middle point value is not more than a specified value; and a control process for resetting, when the absolute value of the difference obtained in this middle point value discriminating process is equal to or larger than a specified value, the corrected value of the record pulse to a value smaller by a specified 1 step, if a sign of the above difference repeating the middle point value detecting process is positive, or to a value larger by a specified 1 step if the sign of the difference is negative, and then repeating the middle point value detecting process.

25. An optical recording device control method according to claim 24, wherein a series of processes started from the initial set-up process are executed just after power for the device is turned ON.

26. An optical recording device control method according to claim 24, wherein a series of processes started from the initial set-up process are executed when a temperature in a driving system in the optical recording device is equal to or more than a specified value.

27. An optical recording device control method according to claim 24, wherein a series of processes started from the initial set-up process are executed once for every specified period of time while a driving system of the optical recording device is in operation.

28. An optical recording device control method according to claim 24, wherein a series of processes started from the initial set-up process are executed during down time of a controller for controlling a driving system in the optical recording device.

29. An recording device control method according to claim 24, wherein a series of processes started from the initial set-up process are executed each time an information recording medium in the optical recording medium is exchanged with a new one.

30. A method of controlling an recording device which uses an exchangeable optical recording medium as a recording medium, and which executes an operation to record data in a state where a pulse width of a record pulse has been corrected from a pulse width in record modulation: comprising:

an initial set-up process for setting a corrected value of a record pulse in a specified value;

an amplitude/middle point value detecting process for detecting a first amplitude value corresponding to an amplitude of a regenerative signal for a first recording pattern, and a second amplitude value corresponding to an amplitude of a regenerative signal for a second recording pattern, and for detecting a first middle point value corresponding to a middle point of an envelop of a regenerative signal for the first recording pattern and a second middle point value corresponding to a middle point of an envelop of a regenerative signal for the second recording pattern, by recording the first recording pattern having a short record mark length and the second recording pattern having a long record mark length in a specified area of the optical recording medium and regenerating the first recording pattern and the second recording pattern;

an amplitude value ratio discriminating process for checking that a quotient obtained by dividing the first amplitude value obtained in the amplitude/middle point value detecting process by the second amplitude value is equal to or more than a specified value;

a middle point difference discriminating process for checking that an absolute value of a difference obtained by subtracting the first middle point value obtained in the amplitude/middle point value detecting process from the second middle point value is not more than a specified value; and a control process for resetting the corrected value of the record pulse and then repeating the amplitude/middle point value detecting process, when the quotient the is not more than the specified value in the amplitude value ratio discriminating process, and simultaneously when the absolute value of the difference obtained in the middle point difference discriminating process is not more than the specified value, according to a sign of the difference.

31. An optical recording device control method according to claim 30, wherein a series of processes started from the initial set-up process are executed just after power for the device is turned ON.

32. An optical recording device control method according to claim 30, wherein a series of processes started from the initial set-up process are executed when a temperature in a driving system in the optical recording device is equal to or more than a specified value.

33. An optical recording device control method according to claim 30, wherein a series of processes started from the initial set-up process are executed once for every specified period of time while a driving system of the optical recording device is in operation.

34. An optical recording device control method according to claim 30, wherein a series of processes started from the initial set-up process are executed during down time of a controller for controlling a driving system in the optical recording device.

35. An optical recording device control method according to claim 30, wherein series of processes started from the initial set-up process are executed each time an information recording medium in the optical recording medium is exchanged with a new one.

36. A method of controlling an optical recording device which uses an exchangeable optical recording medium as a recording medium, and which executes an operation to record data in a state where a pulse width of a record pulse has been corrected from a pulse width in record modulation, comprising:

an initial set-up process for setting a corrected value of a record pulse in a specified value;

an amplitude/middle point value detecting process for detecting a first amplitude value corresponding to an amplitude of a regenerative signal for a first recording pattern, and a second amplitude value corresponding to an amplitude of a regenerative signal for a second recording pattern, and for detecting a first middle point value corresponding to a middle point of an envelop of a regenerative signal for the first recording pattern and a second middle point value corresponding to a middle point of an envelop of a regenerative signal for the second recording pattern by recording the first recording pattern having a short record mark length and the second recording pattern having a long record mark length in a specified area of the optical recording medium and regenerating the first recording pattern and the second recording pattern;

an amplitude value ratio discriminating process for checking that a quotient obtained by dividing the first amplitude value obtained in the amplitude/middle point value detecting process by the second amplitude value is equal to or more than a specified value;

a middle point difference discriminating process or checking that an absolute value of a difference obtained by subtracting the first middle point value obtained in the amplitude/middle point value detecting process from the second middle point value is not more than a specified value; and a control process for resetting a corrected value of the record pulse, when the quotient obtained in the amplitude value ratio discriminating process is not more than the specified value, and simultaneously when the absolute value of the difference obtained in the middle point difference discriminating process is not less than the specified value, to a smaller value if the sign of the difference described above is positive, or to a larger value if the sign is negative.

37. An optical recording device control method according to claim 36, wherein a series of processes started from the initial set-up process are executed just after power for the device is turned ON.

38. An optical recording device control method according to claim 36, wherein a series of processes started from the initial set-up process are executed when a temperature in a driving system in the optical recording device is equal to or more than a specified value.

39. An optical recording device control method according to claim 36, wherein a series of processes started from the initial set-up process are executed once for every specified period of time while a driving system of the optical recording device is in operation.

40. An optical recording device control method according to claim 36, wherein a series of processes started from the initial set-up process are executed during down time of a controller for controlling a driving system in the optical recording device.

41. An optical recording device control method according to claim 36, wherein a series of processes started from the initial set-up process are executed each time an information recording medium in the optical recording medium is exchanged with a new one.

* * * * *